United States Patent [19]

Plaatsman

[11] Patent Number: 5,193,599
[45] Date of Patent: Mar. 16, 1993

[54] APPARATUS FOR MOUNTING SPOKES BETWEEN A HUB AND RIM OF A SPOKE WHEEL

[75] Inventor: Jacob Plaatsman, Diemen, Netherlands

[73] Assignee: Holland Mechanics B.V., Netherlands

[21] Appl. No.: 760,867

[22] Filed: Sep. 16, 1991

[30] Foreign Application Priority Data

Sep. 18, 1990 [NL] Netherlands ............... 9002059

[51] Int. Cl.$^5$ ................................ B21K 1/34
[52] U.S. Cl. .................................. 157/1.55
[58] Field of Search .............. 81/54, 57.44, 439; 157/1.5, 1.55

[56] References Cited

U.S. PATENT DOCUMENTS 3,636,614  1/1972  Damman et al. ........... 157/1.5 X
3,908,729  9/1975  Carminati .................. 157/1.5
4,505,315  3/1985  Kaufeldt .................... 157/1.5

FOREIGN PATENT DOCUMENTS 2727648  12/1977  Fed. Rep. of Germany ..... 157/1.55

Primary Examiner—James G. Smith
Attorney, Agent, or Firm—Wolf, Greenfield & Sacks

[57] ABSTRACT

An apparatus for mounting spokes (1) between a hub (2) and rim (3) of a spoke wheel (4) comprises a hub support (8) for rotatably supporting the hub. Rim support rollers (11) support the rim concentrically around the hub. A drive (10) is provided for rotating the rim around the axis of the wheel. A rotatably drivable screw driver (14) is adapted to screw nipples (7) onto respective spokes through holes (6) in the rim. By means of a CCD camera (43) the positions of the holes (6) in the rim (3) are detected and a spoke support (36) and the screw driver (14) are adjustable to allow the screw driver and each set of nipple (7), spoke (1) and nipple hole (6) in the rim (3) to be accurately aligned.

20 Claims, 4 Drawing Sheets

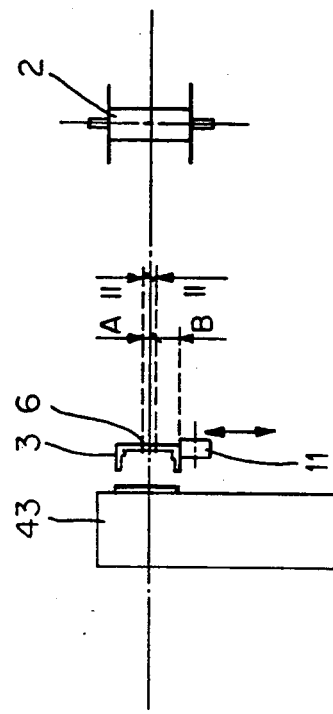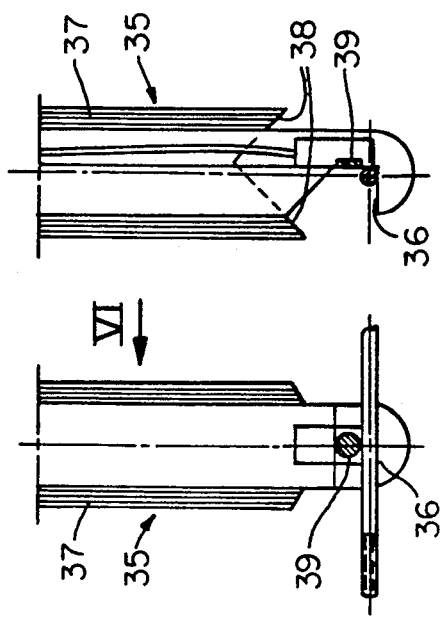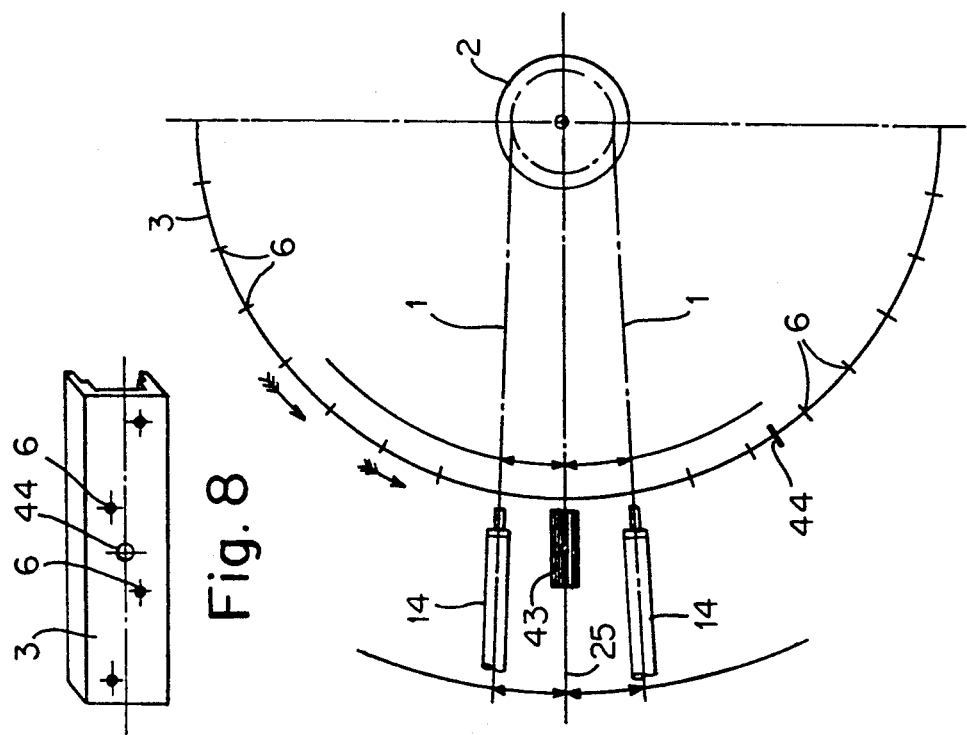

APPARATUS FOR MOUNTING SPOKES BETWEEN A HUB AND RIM OF A SPOKE WHEEL

The invention relates to an apparatus for mounting spokes between a hub and rim of a spoke wheel, comprising a hub support for rotatably supporting the hub, rim support rollers for supporting the rim concentrically around the hub, drive means for rotating the rim around the axis of the wheel, and a rotatably driveable screw driver for screwing nipples onto respective spokes through holes in the rim.

In a known embodiment of such an apparatus a hub with introduced spokes is positioned in a fixture and the rim is clamped in guiding rollers in order to handle the spokes. The rim is rotated by means of a mechanical indexing mechanism so that the nipple holes are subsequently positioned in front of the screw driver. The screw driver is positioned perpendicular to the rim. The screw driver includes a pin in order to center it within the nipple thereby obtaining a relative positioning. Due to inaccuracies of the position of the nipple holes in the rim, due to catches in the indexing system and due to the variations in the direction of the screw driver and the spokes, it often happens that the pin of the screw driver does not fall into the hole of the nipple, that the nipple does not come into the nipple hole of the rim, or that the nipple is not properly turned onto the spoke which leads, in all cases, to an interruption of the process.

It is an object of the invention to remove this disadvantage, and for this purpose it provides means for accurately aligning each time the screw driver and each set of nipple, spoke and nipple hole in the rim.

In one embodiment of the apparatus according to the invention, the screw driver and a respective spoke clamp are mounted on a tilting slide with which the screw driver and the spoke clamp, in fixed interrelationship, are adaptable to the direction of the spokes of the two groups of spokes which are connected with one of the flanges of the hub.

In this manner the screw driver is allowed to be aligned with the spokes of both spoke groups, and when the screw driver is adjusted the spoke clamp, which clamps a spoke every time in the right position in front of the screw driver, is automatically moved along with the screw driver.

Preferably, the tilting slide is provided with a nipple supply of which the connection to the screw driver follows the adjusting movements of this screw driver.

Due to this feature a proper supply of the nipples to the screw driver may always take place independent of the position of the screw driver.

It is an advantage when the spoke clamp is provided with a sensor for sensing the presence of a spoke within the spoke clamp, and with control means for closing the clamp around a spoke in response to a signal of the sensor.

Such a sensor may lead to an increase of the speed of the apparatus when the spokes are manually introduced, while this sensor improves the reliability when the spokes are introduced mechanically.

To obtain a quicker operation of the apparatus and consequently to increase the capacity thereof it is possible to provide two screw drivers for substantially simultaneously mounting two nipples on two spokes of one of said spoke groups.

A very favourable embodiment of the apparatus according to the invention is characterized in that said aligning means include a scanning and recording means to determine and fix in a memory of the control means the position of the holes in the rim.

With this scanning and registration means it is possible to determine the exact positon of each individual nipple hole and to fix this position in the memory of the control means. As a result it is permitted to detect frequently occuring variations of the position of the nipple holes in the rim and to compensate for it.

This scanning and registration means, preferably including an optical scanning means in the form of a CCD camera, allows the relative positioning of the screw driver and the rim as a function of the positions of the holes in the rim fixed by the scanning and registration means.

In the embodiment having two screw drivers, preferably both screw drivers are relatively displaceable as a function of the relative positions of a respective pair of holes in the rim fixed by the scanning and registration means.

To further improve the performance of the apparatus it may comprise means to determine the diameter of each rim at the position of the rim bed. This determination of the diameter may be absolute or relative to an average size. If the measured diameter is smaller then the average value the control means may cause the nipples to be screwed further onto the spokes, and vice versa. As a result thereof variations in the diameter of the rims are compensated for and evenly tightened wheels are obtained.

The invention also includes a method of mounting spokes between a hub and a rim of a spoke wheel, wherein prior to aranging the spokes the relative or absolute diameter of the rim at the position of the rim bed is measured, whereafter the spokes are mounted between hub and rim and nipples are screwed through holes in the rim onto the spokes through a number of revolutions depending on the measured diameter of the rim.

The invention will hereafter be elucidated with reference to the drawing schematically showing an embodiment of the invention by way of example.

FIG. 4 shows detail IV of FIG. 2 on an enlarged scale and in sectional view.

FIG. 5 shows detail V in FIG. 2 on an enlarged scale.

FIG. 6 is a view along arrow VI in FIG. 5.

FIG. 7 is a schematic illustration of the scanning of holes in the rim of the spoke wheels.

FIG. 8 shows a perspective view of a portion of a rim having a pattern of holes therein.

FIG. 9 is a very schematic plan view of a spoke wheel and the nipple screw drivers.

Figure 1:
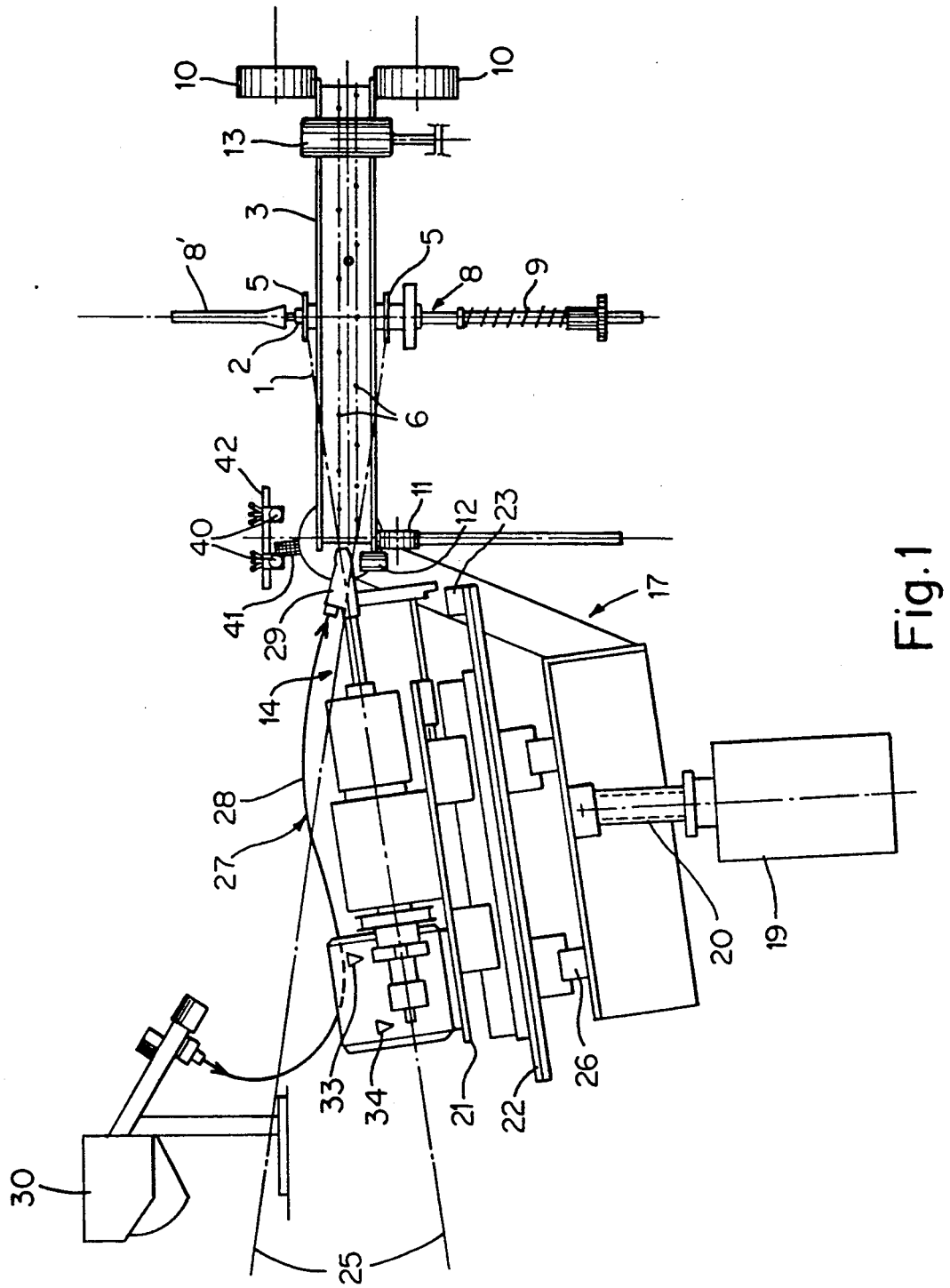
FIG. 1 and 2 are schematic side views of the embodiment of the apparatus according to the invention in two different positions wherein for the sake of clarity some parts are only illustrated in FIG. 1 and other parts only in FIG. 2.
Figure 2:
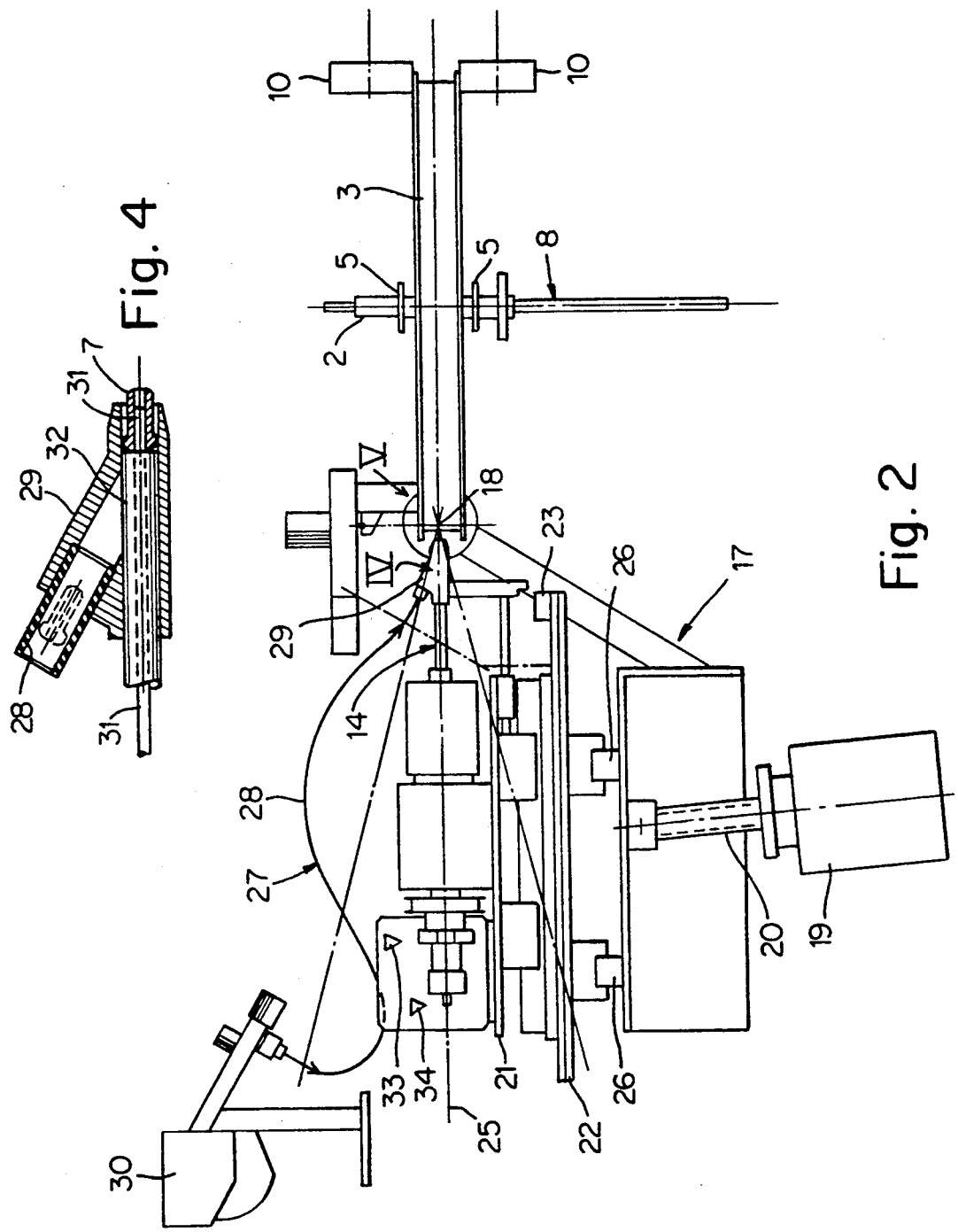
Figure 3:
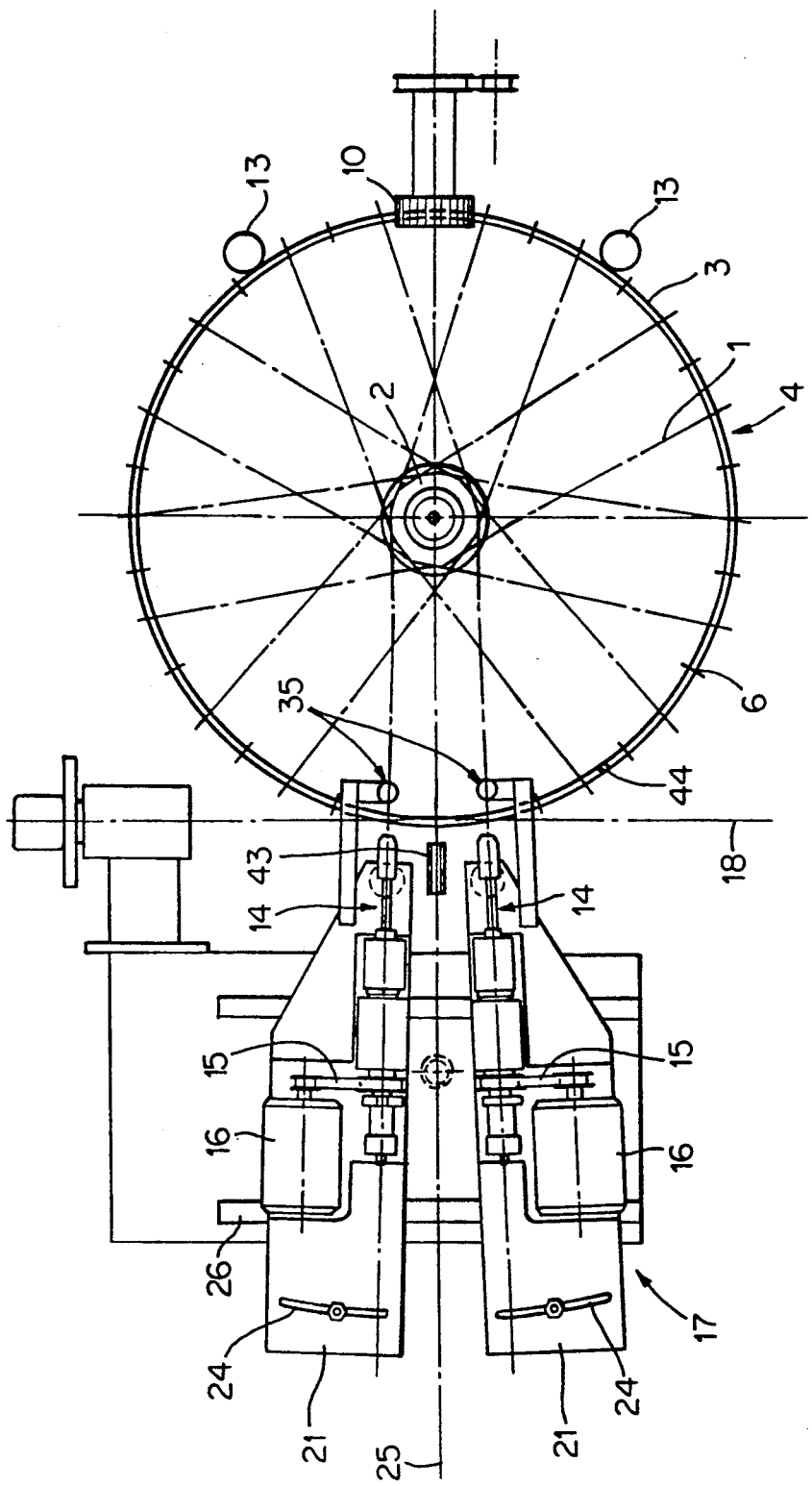
FIG. 3 is a schematic plan view of the apparatus of FIG. 1 and 2.

Referring to the drawing and in particular FIG. 1–3 thereof, there is shown an apparatus for mounting spokes 1 between a hub 2 and a rim 3 of the spoke wheel 4. It is intended therewith to introduce the spokes 1 through holes in both flanges 5 of the hub and subsequently to bring the end thereof which is provided with threads into a respective nipple hole 6 in the rim 3, whereafter a nipple 7 is screwed through hole 6 onto the threads of each spoke 1. The spokes are divided into two groups, wherein the spokes 1 of the one group is connected with the one flange 5 of the hub 2, while the spokes 1 of the other group are in connection with the other flange of the hub 2. The spokes 1 of both of these groups are alternately mounted to the rim.

The apparatus according to the invention comprises a hub support 8 mounted on the frame (not shown) of the apparatus by means of an adjustable spring 9. The hub 2 of the spoke wheel 4 is freely movable and rotatable received in the hub support 8, and the hub 2 is kept upright by a flexible hub clamp 8' which is swung aside when the hub 2 is introduced or removed.

The rim 3 of the spoke wheel 4 rests on one of the drive rollers 10, on the one hand, and on two diametrically opposed and vertically adjustable rim support rollers 11, on the other hand. The drive rollers 10 are driveable in common by a stepping motor (not shown) in order to rotate the rim around its axis. Near the rim support rollers 11 are lateral positioning rollers 12 and laterally of the drive rollers 10 are pressure rollers 13 adapted to urge the rim 3 of the spoke wheel 4 against the positioning rollers 12.

On the side of the rim positioning roller 12 are provided means for mounting and tightening the nipples 7 onto the respective spokes 1 of the spoke wheel 4. These means comprise two screw drivers 14 which are each rotatably driveable by an electric motor 16 through a transmission 15. The screw drivers 14 are mounted on a tilting slide generally indicated with 17 and being tiltable about a transverse axis 18 to align the screw drivers 14 with spokes 1 of said spoke groups of each spoke wheel 4. The tilting slide 17 is tiltable about the transverse axis 18 by means of an electric motor 19 having a screwed spindle 20. The hub holder 8, 8' and the drive and pressure rollers 10, 13 are adjustable to and from the tilting slide 17 to be adapted to different types and sizes of rims 3. When a rim 3 is properly adjusted the transverse axis 18 substantially extends through those nipple holes 6 in the rim 3 that are positioned in front of the screw drivers 14.

Each screw driver 14 is mounted on the tilting slides 17 through two subplatforms 21 and 22 of which the first subplatform 21 is rotatable about a shaft 23 near the tip of the screw driver 14 according to an arc of a slot 24. With this it is permitted to adjust the angle between the screw drivers 14 and a longitudinal axis 25 through the center of the hub support 8. The second subplatform 22 of each screw driver 14 is adjustable along guides 26 extending parallel to the transverse axis 18 to adjust the distance of the screw drivers 14 to said longitudinal axis 25.

For supplying nipples 7 to each screw driver 14 in a proper way, each screw driver 14 is provided with its own nipple supply 27 of which a flexible nipple supply tube 28 opens into a mouthpiece 29 bringing each nipple 7 in line with the front end of the screw driver 14 as shown in FIG. 4. The nipples 7 are directed from a magazine 30 through the nipple supply tube 28 to the mouthpiece 29 by means of pressurized air, said nipple 7 being retained at the mouthpiece 29 in front of the retracted screw driver 14 by means of a retractable retaining means (not shown), whereafter the screw driver 14 is moved forward and a pin 31 of the screw driver 14 is introduced into the bore of the nipple 7. This pin 31 extends through a hollow shaft 32 of the screw driver 14. The number of revolutions of the hollow shaft 32 of each screw driver 14 used for tightening a nipple 7 can be registered by means of a sensor or proximity switch 33, and the longitudinal displacement of the pin 31 with respect to the hollow shaft 32 used for tightening a nipple 7 can be determined by a sensor or proximity switch 34. To the function thereof will be returned later on.

Each subplatform 21 of both screw drivers 14 is provided with a spoke clamp 35 to clamp a spoke 1 exactly aligned with the screw driver 14. FIG. 5 and 6 show in detail the lower end of the spoke clamp 35 having the spoke 1 therein. The spoke clamp 35 comprises a support 36 for the spoke 1 and a slideable sleeve 37 having in its lower end a V-shaped slit 38 for positioning and holding a spoke to be mounted in one point. The spoke support 36 of the spoke clamp 35 is provided with a sensor or proximity switch 39 which is adapted to detect the presence of a spoke 1 on the spoke support 36 of the spoke clamp 35 and to deliver a signal to the control means of the apparatus such that the sleeve 37 of the spoke clamp 35 is moved downwardly and the spoke clamp 35 is closed. Then the respective spoke 1 is exactly aligned with the corresponding screw driver 14 since the spoke clamp 35 follows all adjusting movements of the respective screw driver 14. The spoke clamps 35 are preferably as close as possible to the respective screw drivers 14.

FIG. 1 further shows proximity switches 40 to determine the tilting of the tilting slide 17 about the transverse axis 18 in order to adjust these screw drivers 14 to the spokes of the respective spoke groups of each spoke wheel 4. The proximity switches 40 cooperate with a counter means 41 on the tilting slide 17 and are adjustable one way or another, for example slideable along a rail 42, in order to adapt the tilting angle of the tilting slide 17 to the angle of the spokes 1 to the horizontal plane.

FIG. 7 shows very schematically a scanning means, in this case in the form of a CDD camera 43 for scanning each rim 3 in order to determine the exact position of all nipple holes 6 in the rim 3 and to fix them into the memory of the control means of the apparatus. Both the height of the axis of each hole 6 relative to the lower edge of the rim, and the mutual distance of the individual holes 6 in circumferential direction of the rim 3 are determined and fixed. In the present case the center of the valve hole 44 of the rim 3 is used as reference point. With this scanning means 34 an exact indexing of the rim 3 is enabled such that each time a hole 6 of the rim 3 is positioned exactly in front of the nipple 7 in the screw driver 14. The scanning means 43 also determines then whether the respective rim is a so called fl rim, such as shown in FIG. 8, or a f2 rim in which a first nipple hole 6 on the right hand side of the valve hole 44 is lying below the central plane of the rim 3.

The operation of the apparatus described hereinbefore will now be described with reference to the figures.

First of all a rim 3 is placed on the lower drive roller 10 and the rim support rollers 11 and then the upper drive roller 10 and the pressure rollers 13 are brought into engagement with the rim 3. The tilting slide 17 is or has already been adjusted to the type of wheel 4.

Subsequently the rim 3 is rotated around its axis by the drive rollers 10 and the corresponding stepping motor, during which the CCD camera 43 scans the outer circumference of the rim 3 in order to determine the positions of all nipple holes 6 as well as that of the valve hole 44 serving as reference point and to fix it into the memory of the control means of the apparatus.

During the scanning revolution of the rim 3 a hub 2 is positioned in the hub support 8, wherein the spokes 1 may already be inserted in the flanges 5 of the hub 2 or may be inserted after its placement in this apparatus.

When the positions of the nipple holes 6 are fixed, the motor of the drive rollers 10 is controlled such that in accordance with a predetermined sequence two holes for the spokes of one spoke group are positioned in front of the screw drivers 14. If the angular distance between respective nipple holes 6 does not fully correspond to the angular distance between the screw drivers 14 already adjusted to the nominal angular distance between two nipple holes 6, a correction may be carried out. This correction may consist of a rotation of one of the screw drivers about the shaft 23 or of a small rotation of the rim 3 after having one nipple 7 screwed on the respective spoke 1 by one of the screw drivers 14. When there is a difference in height between the two nipple holes 6, the height of the rim may be adjusted by means of the rim support rollers 11, or one or both screw drivers may possibly be adjusted in vertical direction one way or another.

When a nipple hole 6 is positioned properly in front of the screw driver 14, a spoke 1 is manually or automatically placed on the spoke support 36 of the spoke clamp 35 whereafter a signal of the proximity switch 39 causes the closure of the spoke clamp 35 by the control means and the positioning of the spoke 1 with its threads in front of or in the respective nipple hole 6. Initially the hub 2 of the spoke wheel 4 is positioned slightly higher than in the center of the rim 3 in order to prevent a spoke 1 scratching the rim with its free end when it is introduced into the spoke clamp 35. When the different spokes 1 are tensioned the hub will automatically be pulled into its central position to the rim 3 by pressing the spring 9.

Screwing a nipple 7 onto the respective spoke 1 takes place in a controlled manner. By means of the sensor or proximity switch 34 it is determined when the end of the spoke 1 has come into engagement with the pin 31 of the screw driver 14 during the screwing operation of the nipple 7. In that case the pin is slid by the spoke 1 with respect to the hollow shaft 32 of the screw driver which is detected by the sensor or proximity switch 34. From this moment of engagement on or after a certain sliding distance of the pin 31 with respect to the hollow shaft 32 the nipple 7 is screwed further onto the spoke 1 with a predetermined number of revolutions, which is counted by the sensor or proximity switch 33. The number of revolutions with which a nipple 7 is screwed onto a spoke 1 may be fixed dependent on the type of spoke wheel 4. It is also possible to vary the number of revolutions of the nipple 7 dependent on deviations of the diameter of a certain rim 3 relative to a nominal size. This deviation is measured and the required number of revolutions of the nipples 7 is calculated on the basis thereof. If the diameter of a rim 3 at the position of the rim bed is slightly smaller than the nominal size, then the number of revolutions of the nipples 7 onto the spokes 1 can be increased. With a larger value of the diameter of the rim 3 the number of revolutions of each nipple 7 can, on the contrary, be decreased. In this manner variations in the diameter or the circumference of the rims 3 are compensated and simultaneously properly tensioned spoke wheels 4 are obtained. Apart from that it is noted that the screw drivers 14 are loaded in longitudinal direction when a nipple 7 is screwed on in order to keep the screw driver in engagement with the nipple.

If both screw drivers 14 have screwed both nipples 7 onto the respective spokes 1 the rim 3 is rotated a certain angle such that a next set of nipple holes 6 for spokes of the same spoke group are positioned in front of the screw drivers 14. This method is repeated until all spokes of one spoke group are mounted. Then the tilting slide 17 is tilted such that the angle of the screw drivers 14 with respect to the horizontal equals the angle of the spokes of the second spoke group. In certain cases also the angle of the screw drivers 14 with respect to the longitudinal axis 25 should be adjusted. When there is a difference in height between the nipple holes 6 of both spoke groups it is possible to have both rim support rollers 11 automatically adjusted in vertical direction on the basis of information present in the control means. Subsequently the spokes 1 of the second spoke group can be mounted in the same manner as described. In view of the dimensions of the spoke wheel 4 it will often be necessary to mount the spokes 1 of the second spoke group one by one because the braiding of the spokes 1 into the wheel 4 will otherwise be too complicated. At the end thereof a spoke wheel 4 containing well tensioned spokes 1 has been formed.

The invention is not restricted to the embodiment shown in the drawing by way of example, which can be varied in different manners within the scope of the invention.

I claim:

1. Apparatus for mounting spokes between a hub and a rim of a spoke wheel, comprising a hub support for rotatably supporting the hub, rim support rollers for supporting the rim concentrically around the hub, drive means for rotating the rim around the axis of the wheel, a rotatably drivable screw driver for screwing nipples onto respective spokes through nipple holes in the rim, means for determining positions of each of the nipple holes, and means for controlling said drive means in response to the means for determining to align the screw driver and each set of nipple, spoke and nipple hole.

2. Apparatus according to claim 1, wherein the screw driver and a respective spoke clamp are mounted on a tilting slide with which the screw driver and the spoke clamp, in fixed interrelationship, are adaptable to the direction of the spokes of the two groups of spokes which are connected with one of the flanges of the hub.

3. Apparatus according to claim 2, wherein the tilting slide is provided with a nipple supply of which the connection to the screw driver follows the adjusting movements of this screw driver.

4. Apparatus according to claim 2, wherein the spoke clamp is provided with a sensor for sensing the presence of a spoke within the spoke clamp, and with control means for closing the clamp around a spoke in response to a signal of the sensor.

5. Apparatus according to claim 1, wherein two screw drivers are provided for substantially simultaneously mounting two nipples on two spokes from one of said spoke groups.

6. Apparatus according to claim 1, wherein said means for determining include a scanning and registration means with a memory to determine and fix in said memory the position of the nipple holes.

7. Apparatus according to claim 6, wherein the scanning and registration means comprises an optical scanning means, preferably a CCD camera.

8. Apparatus according to claim 6, wherein the screw driver and the rim are relatively positionable depending on the positions of the holes in the rim fixed by the scanning and registration means.

9. Apparatus according to claim 5 or 8 wherein both screw drivers are relatively displaceable as a function of the relative positions of a respective pair of holes in the rim fixed by the scanning and registration means.

10. Apparatus according to claim 1, further comprising means for determining the diameter of each rim.

11. An apparatus according to claim 10, further comprising means for controlling said rotatably driveable screw driver in response to said means for determining the diameter of each rim.

12. Apparatus for mounting spokes between a hub and rim of a spoke wheel, comprising a hub support for rotatably supporting the hub, rim support rollers for supporting the rim concentrically around the hub, drive means for rotating the rim around the axis of the wheel, a rotatably drivable screw driver for screwing nipples onto respective spokes through holes in the rim, means to rotate the rim such that subsequently the holes of the rim are positioned in front of said screw driver, optical scanning means for scanning the position of the holes in the rim, and control means for controlling the drive means in response to the optical scanning means.

13. Apparatus of claim 12, wherein the optical scanning means is a CCD-camera.

14. Apparatus of claim 12, wherein the screw driver and the rim are relatively positionable depending on the positions of the holes in the rim fixed by the scanning means.

15. Apparatus for mounting spokes between a hub and a rim of a spoke wheel, comprising a hub support for rotatably supporting the hub, rim support rollers for supporting the rim concentrically around the hub, one or more drive rollers for rotating the rim around the axis of the wheel, a rotatably drivable screw driver for screwing nipples onto respective spokes through nipple holes in the rim, a stepping motor to drive the drive rollers, means for determining positions of the nipple holes, and means for controlling said stepping motor in response to said means for determining to align the screw driver and each set of nipple, spoke and nipple hole.

16. Apparatus according to claim 12, further comprising means for determining the diameter of each rim.

17. Apparatus according to claim 16, further comprising means for controlling said rotatably driveable screw driver in response to said means for determining the diameter of each rim.

18. Apparatus according to claim 15, wherein the screw driver and a respective spoke clamp are mounted on a tilting slide with which the screw driver and the spoke clamp, in fixed interrelationship, can be aligned with the direction of the spokes of two groups of spokes which are connected with one of the flanges of the hub.

19. Apparatus according to claim 18, wherein the spoke clamp is provided with a sensor for sensing the presence of a spoke within the spoke clamp, and with control means for closing the clamp around a spoke in response to a signal of the sensor.

20. Apparatus for mounting spokes between a hub and a rim of a spoke wheel, comprising a hub support for rotatably supporting the hub, rim support rollers for supporting the rim concentrically around the hub, one or more drive rollers for rotating the rim around the axis of the wheel, a rotatably drivable screw driver for screwing nipples onto respective spokes through nipple holes in the rim, means for determining the diameter of each rim when the rim is rotated by the drive rollers, and means for controlling said rotatably drivable screw driver in response to said means for determining the diameter of each rim.

* * * * *